United States Patent [19]

Sharp

[11] Patent Number: 5,628,425

[45] Date of Patent: May 13, 1997

[54] COMPOSITE STORAGE TANK HAVING DOUBLE WALL CHARACTERISTICS

[76] Inventor: Bruce R. Sharp, 321 Ski Way Box 5867, Incline Village, Nev. 89450

[21] Appl. No.: 644,258

[22] Filed: May 10, 1996

[51] Int. Cl.⁶ .................................................. B65D 90/02
[52] U.S. Cl. ................ 220/414; 220/457; 220/453
[58] Field of Search ............................ 220/453, 454, 220/455, 456, 457, 414, 586, 588, 589, 590, 469

[56] References Cited

U.S. PATENT DOCUMENTS

| | | |
|---|---|---|
| 3,335,903 | 8/1967 | Anderson . |
| 3,335,904 | 8/1967 | Anderson . |
| 3,394,841 | 7/1968 | Anderson . |
| 3,661,294 | 5/1972 | Pearson et al. ............... 220/414 |
| 3,784,441 | 1/1974 | Kaempen ....................... 220/414 |
| 3,915,776 | 10/1975 | Kaempen . |
| 4,340,630 | 7/1982 | Doty . |
| 4,717,035 | 1/1988 | Dirkin et al. ................. 220/589 |
| 4,778,075 | 10/1988 | Wiegand et al. .............. 220/414 |
| 4,923,081 | 5/1990 | Weaver et al. . |
| 5,004,120 | 4/1991 | Hembert ....................... 220/414 |
| 5,261,764 | 11/1993 | Walles ......................... 220/469 |
| 5,387,455 | 2/1995 | Hörsch ......................... 220/454 |
| 5,476,189 | 12/1995 | Duvall et al. ................. 220/589 |
| 5,492,364 | 2/1996 | Anderson et al. ............. 220/589 |
| 5,553,734 | 9/1996 | Sharp .......................... 220/589 |

Primary Examiner—Stephen J. Castellano
Attorney, Agent, or Firm—Charles R. Wilson

[57] ABSTRACT

A composite storage tank is built which has double wall characteristics. A method of building the tank comprises the steps of applying a viscous resinous core material to a support surface and then winding onto, into or along with the viscous resinous core material discrete filament bundles. The resinous core material encapsulates the filament bundles, but does not significantly penetrate into an interior of the bundles. The substantially resin-free interiors provide flow paths for the ready detection of wall leakage. The resultant composite storage tank has double wall characteristics. A crack or hole in either an inside or outside surface which extends at least to the encapsulated filament bundle interiors will alert the tank's operator/owner to a leakage problem.

7 Claims, 5 Drawing Sheets

COMPOSITE STORAGE TANK HAVING DOUBLE WALL CHARACTERISTICS

This invention relates to a composite storage tank. More particularly, the invention relates to a composite storage tank having double wall characteristics and a method of building the tank.

BACKGROUND OF THE INVENTION

A need became apparent in the 1980's for a reliable underground bulk storage tank system. The then industry standard storage tanks were single wall. A major leak or tank wall collapse could result in 20,000 or more gallons of liquid, e.g. gasoline, being spilled. Even a minor leak could cause substantial environmental damage over time.

When the leakage problem inherent with the single wall storage tank systems became apparent, the tank industry began building double wall storage tank systems. An inner wall contains the stored liquid while an outer wall encompassing the single wall provides back-up or secondary containment capability. A space between the walls is monitored for wall leakage. Examples of such double wall tank systems are found in U.S. Pat. Nos. 4,653,312, 4,739,659, 4,875,361, 4,925,046, 5,017,044, 5,020,358 and 5,167,142. Such systems have proved reliable. Many of the double wall storage tank systems now being sold are based on their designs.

Now that the reliability of double wall tank systems have been generally recognized, the industry has begun to focus on producing the tanks more economically. A savings in raw material costs and a savings in labor costs are possible.

In accord with a need for a more economical storage tank system, there has now been developed a method of building a composite storage tank. The tank is built by a method which results in a savings in both raw material and labor costs. The resultant storage tank has double wall characteristics which gives it performance attributes that make it a viable alternative to current double wall storage tank systems.

SUMMARY OF THE INVENTION

A method of building a composite storage tank comprises the steps of applying a viscous resinous core material to a support surface and winding onto, into or along with the viscous resinous core material discrete filament bundles. The resinous core material encapsulates the filament bundles, but does not significantly penetrate into an interior of the bundles. The substantially resin-free interiors provide flow paths for the ready detection of wall leakage. The resultant composite storage tank has double wall characteristics. A crack or hole in either an inside or outside surface which extends at least to the encapsulated filament bundle interiors will alert the tank's operator/owner to the problem.

BRIEF DESCRIPTION OF THE INVENTION

DETAILED DESCRIPTION OF THE INVENTION

The composite storage tank of the invention is particularly useful as an underground storage tank for the bulk storing of gasoline at retail gasoline service stations. The description which follows is with respect to such a tank. It should be understood the invention is useful for producing storage tanks of any size and for holding virtually any liquid, above ground as well as underground.

Figure 1:
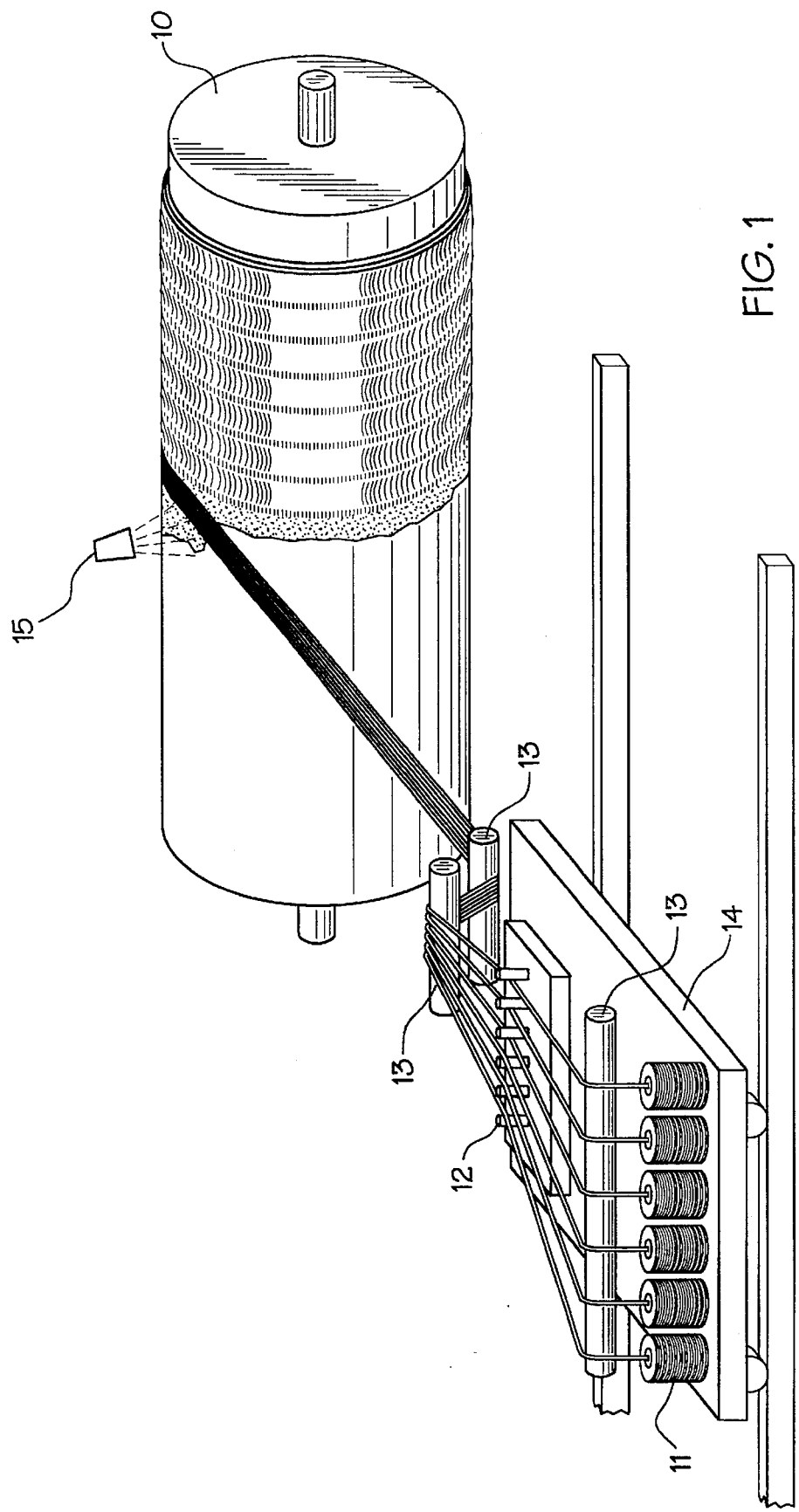
FIG. 1 is an environmental view of a half-section of composite storage tank of the invention in the process of being built on a male mandrel.

With reference to FIG. 1, there is shown a male mandrel 10 in the process of having a half-section composite storage tank built on its outer surface. As typical in the industry, a half-section of the storage tank with a domed end cap is formed on the mandrel. The mandrel is collapsed and the formed half-section tank set aside. Another half-section tank is formed in the same manner and removed from the mandrel. Finally, the two half-section tanks are aligned and permanently sealed together to form a full tank. A manway is formed on the cylindrical wall as the half-section is being built or subsequently added. Piping access holes may be added.

The mandrel 10 and its mode of operation is conventional. The mandrel has a cylindrical shape with a diameter approximate that desired for the storage tank, typically from about four feet to about ten feet. An electric motor and drive system (not shown) rotate the mandrel at a predetermined speed.

Generally, in accord with this invention, a viscous resinous core material and a set of discrete filament bundles are applied to the mandrel 10 and cured to form the composite wall storage tank. Initially, a mold release agent is applied to the mandrel to facilitate removal of the half-section tank when formed. Thereafter, an optional though preferred gel coat is applied to the mandrel, followed by application of viscous resinous core material and filament bundles as described in detail in following paragraphs. The viscous resinous core material and filament bundles are applied separately to the mandrel as shown or the filament bundles are run through a trough of the resinous core material and are simultaneously applied to the mandrel.

Still with reference to FIG. 1, a bundle dispensing means comprises a set of vertically disposed spools 11, a collecting guide 12, and tension shafts 13. Six spools are depicted. A greater number of spools can be used for increased production time. A lesser number of spools also can be used, including a single spool, though is less preferred because of a consequent increase in time needed to form the half-section tank. The positions of the tension shafts relative to another are adjusted to increase or decrease the amount of tension exerted on the bundles. The amount of tension on the filament bundles during the winding step helps to determine the degree of their embedding into the viscous resinous core material. As evident, the spools, collecting guide and tension shafts are mounted on a cart 14. The cart is motorized and moves laterally at a predetermined speed to wind the filament bundles in a single ply around the mandrel as it rotates. One or more plys of the filament bundles are wound onto the mandrel, preferably at an about 5–30 degree angle to the longitudinal axis of the mandrel as it rotates. A resin spray means 15 moves laterally along the longitudinal axis of the mandrel at a predetermined speed as the filament bundles are being wound onto the mandrel's surface.

In accord with this invention, the flow characteristics of the resinous material must be carefully controlled to prevent total resin impregnation or full wet-out of the filament bundles. That is, resin encapsulation of each of the filament bundles is desired, but significant resin penetration into the interiors of the bundles is avoided. The interiors of the filament bundles must remain substantially resin-free to provide flow paths for the detection of leakage into or through the composite wall as further discussed below.

The filament bundles used in the invention have several continuous filaments which are preferably discrete filaments loosely held together as tows. The individual filaments can also be loosely twisted together to form a full bundle. Further, the individual filaments can be loosely twisted together to form several filament yarns which are then formed into the bundles. Common forms and common nomenclature for the filament bundles include cords, lines, ropes, yarns, strings and twines.

Individual filaments of most interest because of long lasting strength are manufactured filaments made from polymeric synthetic resins or glass. Examples of suitable filaments used to form the bundles include acrylic, nylon, polyester, rayon, acetate, triacetate, olefin and glass filaments. The filaments are solid or hollow. Filaments of most interest are substantially inelastic. However, elastic filaments such as made from an open-cell foam material are feasible. The filaments typically have denier's, i.e. diameters of from about 3.5 microns to about 24 microns, through smaller or larger diameter filaments are feasible. The individual filaments can as well have another cross-section shape, e.g. rectangular or oblong. The filaments are also made from natural fibers such as cotton and wool, though are less preferred because of their ability to absorb moisture and swell over time to the extent leak detection flow problems within the bundles are created. The preferred manufactured filaments are more durable. Highly preferred are fiberglass filaments because of their strength characteristics.

The width and thickness of the individual filament bundles can vary widely. Preferably, they are about 30 mils about 750 mils in width, and about 20 mils to about 500 mils in thickness. Preferred filament bundles are formed from fiberglass filaments wherein the individual filaments have deniers ranging from about 3.5 microns to about 24 microns.

One purpose of the discrete filament bundles is to provide a means whereby communication paths are created within the composite wall. Another purpose of the filament bundles is to strengthen the wall. To accomplish these objectives, it is important that the density of the filaments which make up the bundles and the flow characteristics of the liquid viscous resinous core material used in forming the composite wall be coordinated so that total resin penetration through the individual filaments is avoided to provide flow paths in the mid-portion of each bundle.

Examples of resinous core materials used in the invention include polyesters, vinylesters, polyurethanes and polyepoxides. Other resins are available and can be used. As aforementioned, the resinous material's flow characteristics prior to application are adjusted to be viscous and substantially non-flowable once a shearing force is removed. This non-flowable characteristic is partially responsible for preventing significant resin penetration to the interior of each filament bundle. A high level of thixotropic agent is included with the liquid resinous core material prior to application. Preferably, for each 100 parts by weight (pbw) resinous material there is from about 1 pbw to about 10 pbw of the thixotropic agent. Examples of suitable thixotropic agents include fumed silica, Thixcin R and ST, and Attagel 50 mineral thickener. Fillers are also preferably included with the resinous material at a level of from about 50 pbw to about 200 pbw per 100 pbw of the resinous material to aid in reducing resin flow into the bundles. Examples of suitable fillers are calcium carbonate, silica flour, bentonites, and powdered clays.

Figure 2:
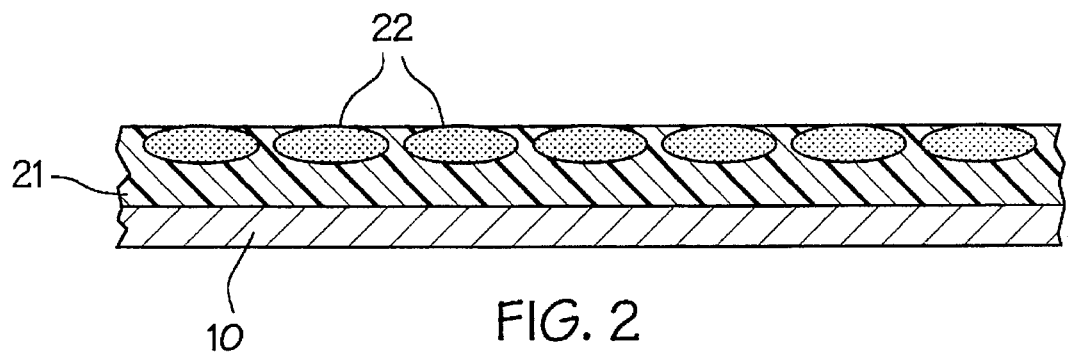
FIG. 2 is a view in section showing in detail a portion of the composite storage tank wall while still on the mandrel of FIG. 1 in an early formation stage.
Figure 3:
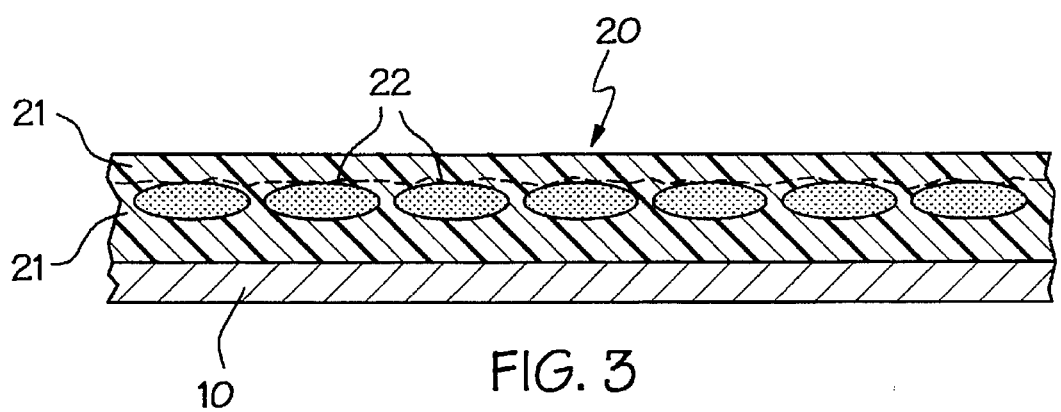
FIG. 3 is a view in section of a portion of the composite storage tank wall while still on the mandrel of FIG. 1.

FIGS. 2 and 3 show the formation of a section of wall 20 while still on the mandrel 10. As shown in FIG. 2, initially a thin layer of the viscous resinous core material 21 is applied to the mandrel 10. While the first application of the resinous core material is still in a tacky or gelled state, the discrete filament bundles 22 are wound onto the viscous resinous core material and partially embedded therein. Preferably, the thin layer is first gelled to prevent the filament bundles from being forced to the mandrel's surface during the winding step. Tension imparted to the filament bundles by the tension shafts during the winding process also can be adjusted to aid somewhat in this regard. As shown in FIG. 2, the filament bundles have the first application of resinous core material on three sides and partially over a top surface. Thereafter, and with reference to FIG. 3, another application of viscous resinous material 21 is made. Its flow characteristics also are adjusted to result in no or only minimal penetration. Still with reference to FIG. 3, it is evident that the filament bundles 22 are encapsulated by the resinous core material 21. However, the interior of each of the bundles is substantially resin-free.

Most importantly, the resinous material's lack of significant penetration into the filament bundles is such as to leave the mid-portion of each bundle in a substantially unbonded state. This ensures the continuous closed communication paths which are needed for leak detection purposes. Some resin penetration into a filament bundle is possible, though each bundle's mid-portion is in the substantially unbonded state.

Figure 4:
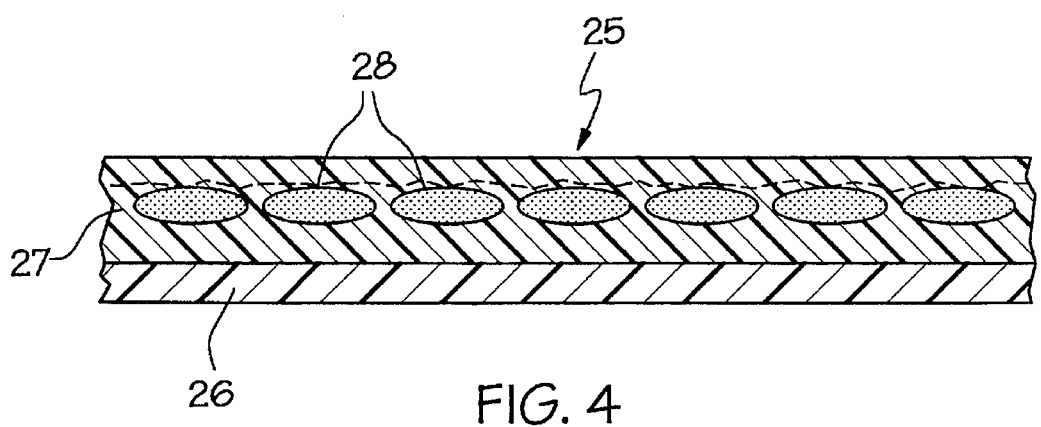
FIG. 4 is a partial view in section of another composite storage tank wall of the invention wherein a gel coat forms an underside of the wall.

FIG. 4 illustrates a section of wall 25 of a composite storage tank removed from the mandrel. In its formation, a gel coat 26 is initially applied to the mandrel. Thereafter a viscous resinous core material 27 and discrete filament bundles 28 are applied. The gel coat 26 is conventional in nature. It comprises a gasoline-resistant resin and may be filled with a very fine synthetic fiber. As known in the industry, a resin-rich coat with C-Vail can be used instead of the gel coat. In either case, enhanced chemical resistance to a stored liquid is obtained. The gel coat is typically about 10 mils to about 40 mils thick. The balance of the composite wall is built as above described with respect to FIGS. 1–3, though the viscous resinous core material additionally includes a reinforcing material. Examples of such materials are a fibrous material such as fiberglass and chopped fiberglass strands. As well known in the tank building industry, the reinforcing material adds strength and thickness to a FRP (fiberglass reinforced plastic) wall. It can be mixed in with the viscous resinous core material or more preferably separately sprayed along with the viscous resinous core material in the wall's formation. Preferably, two applications of the resinous core material and fibrous material are used as depicted by the dotted lines.

Figure 5:
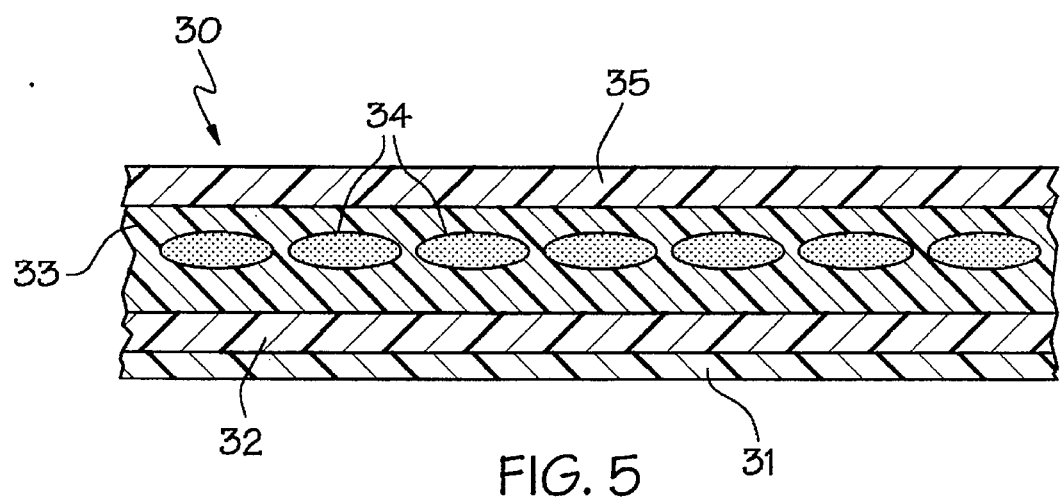
FIG. 5 is a partial view in section showing a preferred composite storage tank wall having an inner and outer fibrous reinforced resinous material.

FIG. 5 illustrates a section of wall 30 of a highly preferred composite storage tank. The section of wall 30 comprises a gel coat 31, an inner fibrous reinforced resinous material 32, a viscous resinous core material 33 with discrete filament bundles 34 embedded therein, and an outer fibrous reinforced resinous material 35. The inner and outer layers of fibrous reinforced resinous material substantially enhance the strength and dimensional stability of the composite wall and their use is preferred for this reason. The gel coat, or alternatively resin-rich coat, and viscous resinous core material with the filament bundles are applied to a mandrel as above described with respect to FIG. 4.

The fibrous reinforced resinous materials 32 and 35 are formed from conventional fibrous material and resinous material in a manner well known in the FRP industry. The above described resins used in the resinous core material are used here as well. Preferably, the fibrous material in the form of chopped strands and the resinous material are separately sprayed simultaneously onto the viscous resinous core material 33 while in an uncured tacky or fully cured state. Optionally, though less preferred, either layer of fibrous reinforced resinous material can be omitted without losing the benefit of the remaining layer.

Figure 6:
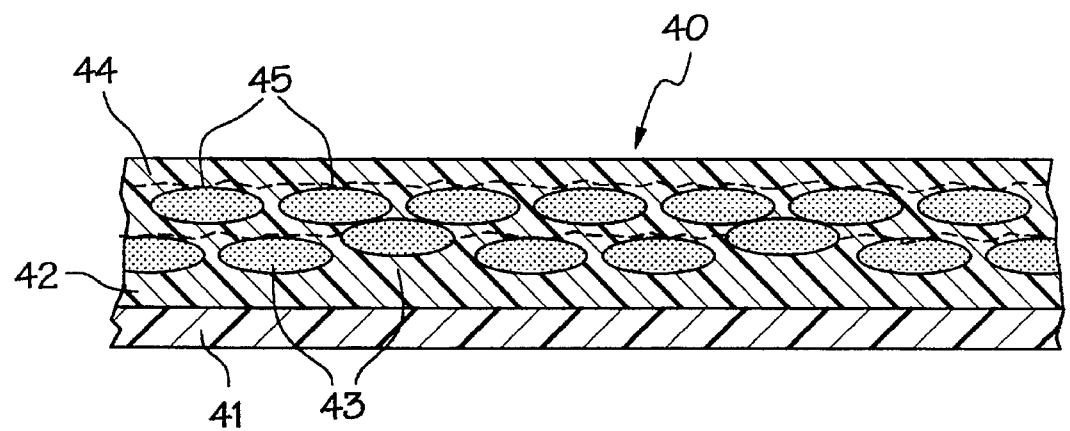
FIG. 6 is a partial view in section showing in detail another composite storage tank wall wherein two plys of filament bundles at slight cross angles are used.

FIG. 6 illustrates a section of wall 40 of another composite storage tank wall. The wall section comprises a gel coat 41, a resinous core material 42 with discrete filament bundles 43 embedded therein and additional resinous core material 44 with discrete filament bundles 45 embedded therein. The raw materials and modes of application are the same as above described. As evident, there can be some overlapping of the filament bundles at random spots throughout the tank wall. As further discussed, intercommunication of individual flow paths within the filament bundles occurs with the overlapping bundles and actually can enhance speed of leak detection.

Figure 7:
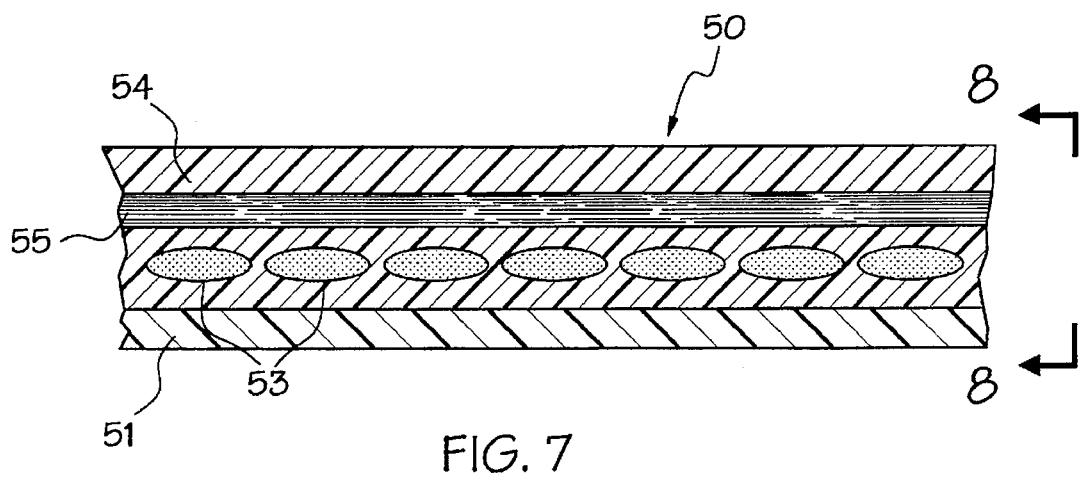
FIG. 7 is a partial view in section showing still another composite storage tank wall wherein two plys of filament bundles at substantial right angles to one another are used.
Figure 8:
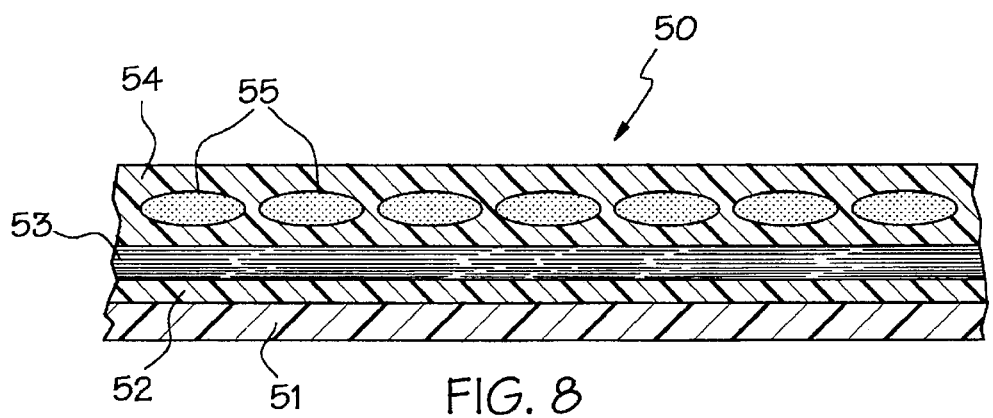
FIG. 8 is a sectional view of the composite storage tank wall of FIG. 7 taken along line 8—8 thereof.

FIGS. 7 and 8 show a section of wall 50 of an alternative composite storage tank wall. Two sets of filament bundles are used, though at substantially right angles to one another. The wall section is feasible, though is not preferred because of increased labor and equipment costs in applying the filament bundles along the mandrel's longitudinal axis. The wall comprises a gel coat 51, resinous core material 52 with discrete filament bundles 53, and additional resinous core material 54 with filament bundles 55. A resin-rich coat can be used in place of the gel coat. The resinous core materials are viscous when applied as described above to ensure that the interiors of the filament bundles remain substantially resin-free. The viscous resinous material can be sequentially applied to ensure encapsulation of the filament bundles. While not shown, some overlapping of the respective filament bundles occurs so that individual flow paths are interconnected. This can enhance the ability to detect leakage.

Figure 9:
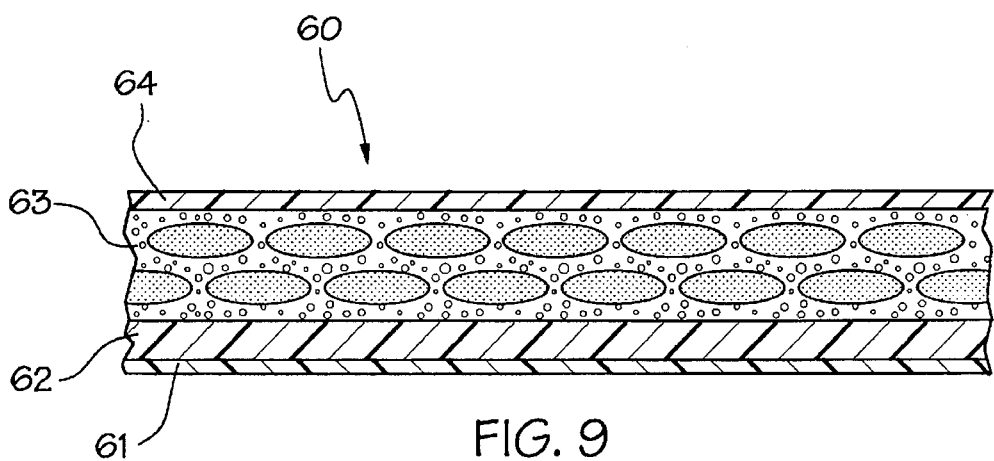
FIG. 9 is a partial view in section showing in detail a composite storage tank wall wherein a foamed core is provided.

FIG. 9 illustrates a section of wall 60 of still another composite storage tank wherein a foamed layer of resinous core material encapsulates filament bundles. The wall includes a gel coat 61, a fibrous reinforced resinous material 62, a foamed resinous core material 63 with filament bundles 64, and additional fibrous reinforced resinous material 65. The materials and modes of application of the gel coat and the two fibrous reinforced resinous materials are similar to that described above with reference to FIGS. 6–8. However, the resinous core material includes a foaming agent such that after its application with the filament bundles a closed cell foam encapsulating the filament bundles results. The advantage of the described wall is a consequent wall stiffness and thickness.

Figure 10:
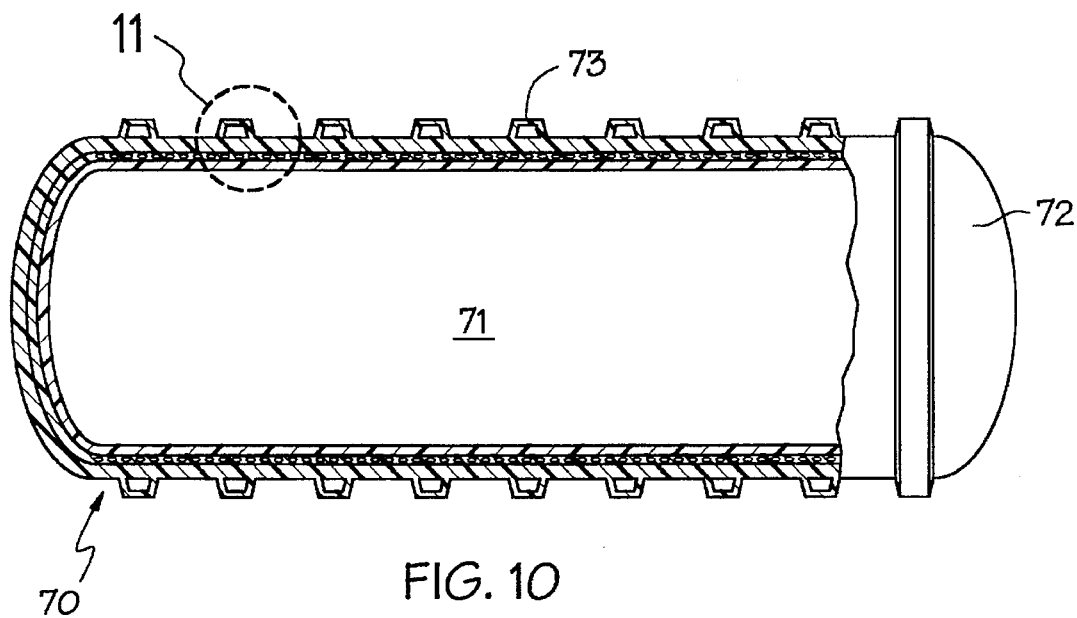
FIG. 10 is a side view of a composite storage tank of the invention with support ribs added for enhanced strength.
Figure 11:
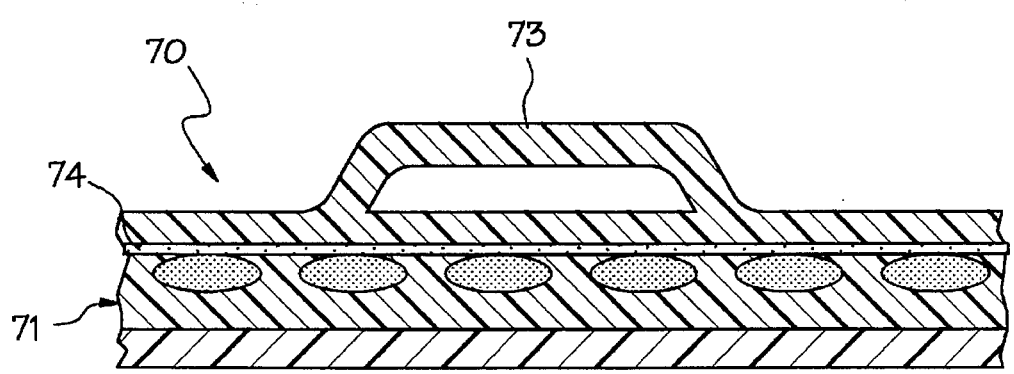
FIG. 11 is a partial view in section of the composite storage tank of FIG. 10 taken along line 11.

FIGS. 10 and 11 show a composite storage tank 70 of the invention which is particularly preferred. The cylindrical-shaped main body 71 of the tank is constructed as above described with reference to FIG. 4. Domed end caps 72 are secured to each end of the main body 71. A set of support ribs 73 is positioned to extend circumferentially around the tank wall. They are conventional in nature and are used to enhance the strength of the tank against both internal and external forces. A manway (not shown) and/or piping access holes (not shown) are added for their known functions.

It should be evident that mid-portions of the filament bundles of the composite wall serve as closed communication paths. Such paths provide a means whereby any leakage of liquid or air can be conveyed and/or detected. Damage of the storage tank system's composite wall will cause leakage which will lead to one or more of the communication paths. The communication paths in turn all lead directly or indirectly to a monitoring station. High speed communication paths are preferably added in selected areas of the composite wall to intersect with the aforedescribed filament bundle paths. Preferably, the high speed communication paths are found in the storage tank's cylindrical wall and end caps. They further extend longitudinally along the top and/or bottom of the tank to intersect with the flow paths within the filament bundles. These high speed communication paths are provided by, for example, apertured tubes, a fibrous strip material, or a foam-type strip material. The strip materials are capable of readily transmitting liquid or air. One such high speed communication path 74 made of a foam-type strip material is seen best in FIG. 11. It is necessary that the high speed communication paths be in fluid communication with the interiors of the encapsulated filament bundles to achieve a quick detection of leakage in any part of the storage tank. Accordingly, a part of any encapsulated filament bundle where a cross-over or cross-under of a high speed communication path occurs is bared to access its interior. Simply removing a part of the encapsulating resin where the cross-over or cross-under occurs is feasible. Alternatively, the filament bundle cross-over or cross-under areas are not coated with the viscous resinous core material, e.g. by masking over such areas.

Various means of detecting leakage in the composite storage tank of the invention are used. Reference is made to my U.S. Pat. No. 4,869,386, Column 5, line 36 to Column 6, line 46 for examples of monitoring means, the disclosure of which is hereby incorporated by reference.

The invention has been described with particular reference to the drawings. A detailed description has been given for production of the composite wall. The composite wall is built on a mandrel as shown to form a storage tank. The composite wall can also be built on other support surfaces, such as inside a female mold or on the inside or outside of an existing tank as in a retrofit situation. Other manners of applying the filament bundles and resinous materials can be used. For example, the individual filament bundles can run vertically, horizontally, and at angles to the axis of the storage tank. These also can be multiple layers of bundles. The resinous material which encapsulates the filament bundles to form the flow paths can be applied all in one step or several steps and by different techniques. For example, the resinous core material can be sprayed or poured onto the filament bundles to cover primarily the sides and tops of the bundles, while the bottom of the filament bundles are covered by a previously applied gel coat or fibrous reinforced resinous material. Thus, total encapsulation is achieved by the combined gel coat or fibrous reinforced resinous material and viscous resinous core material. These and other variations of the invention of an obvious nature are considered within the scope of the appended claims.

I claim:

1. A composite storage tank having double wall characteristics, comprising:
   (a) a cylindrical-shaped tank wall of a resinous core material and discrete filament bundles extending continuously within the tank wall, wherein the resinous core material encapsulates the filament bundles, yet does not significantly penetrate into the filament bundles so that interiors of the filament bundles are substantially resin-free; and
   (b) end caps at each end of the cylindrical-shaped tank wall to form the storage tank.

2. The composite storage tank of claim 1 further comprising a gel coat or resin-rich coat on an interior of the wall to provide stored chemical resistance.

3. The composite storage tank of claim 2 further wherein at least one fibrous reinforced resinous material is formed adjacent the resinous core material.

4. The composite storage tank of claim 1 further comprising an additional resinous core material with filament bundles embedded therewithin over the first resinous core material with filament bundles embedded therein.

5. The composite storage tank of claim 1 wherein the resinous core material is foamed.

6. The composite storage tank of claim 1 further comprising a set of spaced support ribs extending circumferentially around the cylindrical-shaped tank wall.

7. The composite storage tank of claim 1 further comprising a high speed communication path extending longitudinally along the cylindrical-shaped wall and in fluid communication with the interiors of the filament bundles.

* * * * *